United States Patent
Kotikelapudi et al.

(10) Patent No.: US 11,777,425 B2
(45) Date of Patent: Oct. 3, 2023

(54) POWER TRANSFER BASED STALL DETECTION TECHNIQUES FOR STEPPER MOTOR

(71) Applicant: TEXAS INSTRUMENTS INCORPORATED, Dallas, TX (US)

(72) Inventors: Venkata Naresh Kotikelapudi, Bangalore (IN); Laxman Sreekumar, Bangalore (IN); Anand Yadav, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 33 days.

(21) Appl. No.: 17/676,610

(22) Filed: Feb. 21, 2022

(65) Prior Publication Data
US 2023/0268855 A1    Aug. 24, 2023

(51) Int. Cl.
*H02P 8/38* (2006.01)
*H02P 8/12* (2006.01)

(52) U.S. Cl.
CPC . *H02P 8/38* (2013.01); *H02P 8/12* (2013.01)

(58) Field of Classification Search
CPC .... H02P 7/29; H02P 27/08; H02P 7/04; H02P 29/024; H02P 8/22; H02P 8/12; G01R 19/16547; G01R 19/16519; G01R 19/0092; G01R 1/20; H03M 1/001; H03K 5/24; H03K 17/6871; H03K 3/3565; H03K 17/687
See application file for complete search history.

(56) References Cited

U.S. PATENT DOCUMENTS

2019/0109551 A1\*  4/2019  Saw .......................... H02P 8/12

\* cited by examiner

*Primary Examiner* — Said Bouziane
(74) *Attorney, Agent, or Firm* — Valerie M. Davis; Frank D. Cimino

(57) ABSTRACT

In accordance with at least one example of the description, a circuit is adapted to be coupled to a coil of a motor via an H-bridge circuit. The circuit includes a duty sensor, a subtractor, and a comparator. The duty sensor is coupled to the coil of the motor and is configured to provide raw run duty data responsive to a coil current through the coil. The subtractor is coupled to the duty sensor and is configured to provide a differential duty signal responsive to a stall duty signal and a run duty signal obtained using the raw run duty data. The comparator is coupled to the subtractor and is configured to provide a stall signal indicative of a stall condition for the motor responsive to the differential duty signal and a threshold value.

20 Claims, 7 Drawing Sheets

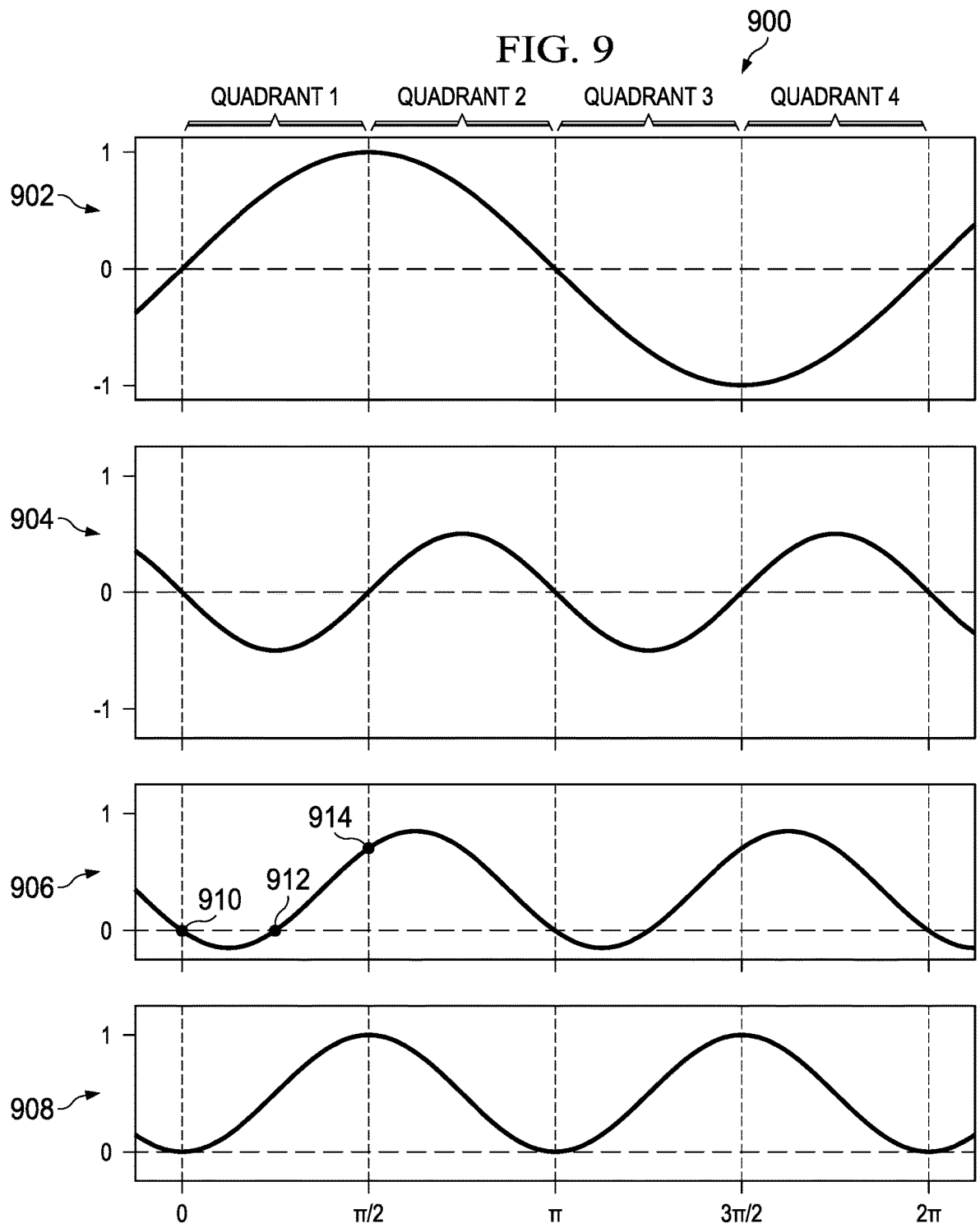

POWER TRANSFER BASED STALL DETECTION TECHNIQUES FOR STEPPER MOTOR

BACKGROUND

Stepper motors are synchronous electrical motors that convert pulsed signals into discrete mechanical rotational movements. A stepper motor may include two coils (e.g., inductive elements) orthogonally arranged about a rotor such that a 90-degree angle between coils to provide spatial separation. A stepper driver may control or regulate coil current flowing through each coil such that a phase separation of 90-degrees exists between the respective coil currents. Synchronization may exist between a rotational position of the rotor and a magnetic field provided by coil current flowing through each coil. Mechanical rotational movement by the rotor may be induced by controlling the coil current flowing through each coil to rotate the magnetic field.

SUMMARY

In accordance with at least one example of the description, a circuit is adapted to be coupled to a coil of a motor via an H-bridge circuit. The circuit includes a duty sensor, a subtractor, and a comparator. The duty sensor is coupled to the coil of the motor and is configured to provide raw run duty data responsive to a coil current through the coil. The subtractor is coupled to the duty sensor and is configured to provide a differential duty signal responsive to a stall duty signal and a run duty signal obtained using the raw run duty data. The comparator is coupled to the subtractor and is configured to provide a stall signal indicative of a stall condition for the motor responsive to the differential duty signal and a threshold value.

In at least one example, the duty sensor is further configured to provide raw stall duty data responsive to the coil current through the coil during the stall condition, the stall duty signal obtained using the raw stall duty data. In at least one example, the circuit further includes a weighting filter coupled to the duty sensor. The weighting filter is configured to provide a run duty signal responsive to the raw run duty data and a step coefficient $K_n$ for step-n of the coil current. In at least one example, $K_n = \sin((90°/M)*n)$, and M denotes a total number of steps in a quarter-cycle of the coil current. In at least one example, a value of the differential duty signal increases as a load torque of the motor increases. In at least one example, the stall signal indicates detection of the stall condition when a value of the differential duty signal breaches the threshold value. In at least one example, the threshold value is below a value of the differential duty signal when the motor is in a no-load condition. In at least one example, the run duty signal is scalable with respect to: an angular velocity of the motor, a motor supply voltage, a peak coil current, a number of steps in a cycle of coil current, or a combination thereof.

In accordance with at least one example of the description, a circuit is adapted to be coupled to a coil of a motor via an H-bridge circuit. The circuit includes a duty sensor, a first subtractor, a second subtractor, and a comparator. The duty sensor is coupled to the coil and is configured to provide raw run duty data responsive to a coil current through the coil. The first subtractor is coupled to the duty sensor and is configured to provide a differential duty signal responsive to a stall duty signal and a run duty signal based on the raw run duty data. The first duty subset signal corresponds to a first quadrant of a half-cycle of the coil current and the second duty subset signal corresponds to a second quadrant of the half-cycle adjacent to the first quadrant. The second subtractor is coupled to the first subtractor and is configured to deduct the second duty subset signal from the first duty subset signal to provide a quadrant differential duty signal. The comparator is coupled to the second subtractor and is configured to provide a stall signal responsive to the quadrant differential duty signal and a threshold value.

In at least one example, the circuit further includes a divider coupled to the first subtractor. The divider is configured to partition the differential duty signal into duty subset signals corresponding to different quadrants of a cycle of the coil current. In at least one example, the first and second duty subset signals are weighted averages of the differential duty signal over the first and second quadrants of the half-cycle of the coil current, respectively. In at least one example, a value of the quadrant differential duty signal indicative of a no-load condition is an upper bound of a range of values for the quadrant differential duty signal. In at least one example, a value of the quadrant differential duty signal indicative of a stall condition is a lower bound of a range of values for the quadrant differential duty signal. In at least one example, the threshold value is defined using one or more of a no-load value and a stall value of the quadrant differential duty signal. In at least one example, an effective duty cycle value $D_{nr}$ of the raw run duty data at step-n of the coil current is determined using a difference over a duration of step-n between a cumulative drive time and a cumulative fast decay time.

In accordance with at least one example of the description, a stepper motor driver is adapted to be coupled to a coil of a stepper motor. The stepper motor driver includes an H-bridge circuit, a gate driver, and a stall detection circuit. The H-bridge circuit is connected to the coil and is operable to provide a coil current to the coil. The gate driver is coupled to the H-bridge circuit and is operable to control the H-bridge circuit by providing a pulse modulated signal to the H-bridge circuit. The stall detection circuit is coupled to the coil and is configured to monitor power transferred to the stepper motor through a duty cycle of the pulse modulation signal. The stall detection circuit includes a duty sensor and a comparator. The duty sensor is coupled to the coil and is configured to provide raw duty data responsive to the coil current. The comparator is coupled to the duty sensor and is configured to provide a stall signal indicative of an operating condition of the stepper motor based on the raw duty data.

In at least one example, a control signal provided at an input of the stepper motor driver varies responsive to the stall signal transitioning to a value indicative of the operating condition of the stepper motor being a stall condition. In at least one example, the stall detection circuit further includes a subtractor coupled to the duty sensor. The subtractor is configured to provide a differential duty signal using the raw duty data and the comparator is configured to provide the stall signal responsive to the differential duty signal and a threshold value. In at least one example, the raw duty data is raw run duty data and the stall detection circuit further includes a first subtractor and a second subtractor. The first subtractor is coupled to the duty sensor and is configured to deduct a stall duty signal from a run duty signal obtained using the raw run duty data to provide a differential duty signal having a first duty subset signal and a second duty subset signal. The first duty subset signal corresponds to a first quadrant of a half-cycle of the coil current and the second duty subset signal corresponds to a second quadrant of the half-cycle that follows the first quadrant. The second subtractor is coupled to the comparator and is configured to deduct the second duty subset signal from the first duty subset signal to provide a quadrant differential duty signal. The comparator is configured to provide the stall signal responsive to the quadrant differential duty signal and a threshold value. In at least one example, a first value of the quadrant differential duty signal indicative of a no-load condition is an upper bound of a range of values for the quadrant differential duty signal and a second value of the quadrant differential duty signal indicative of a stall condition is a lower bound of the range of values.

BRIEF DESCRIPTION OF THE DRAWINGS

FIG. 9 is a diagram of example signal waveforms that show interquadrant power transfer variations within the system.

The same reference numbers or other reference designators are used in the drawings to designate the same or similar (functionally and/or structurally) features.

DETAILED DESCRIPTION

Figure 1:
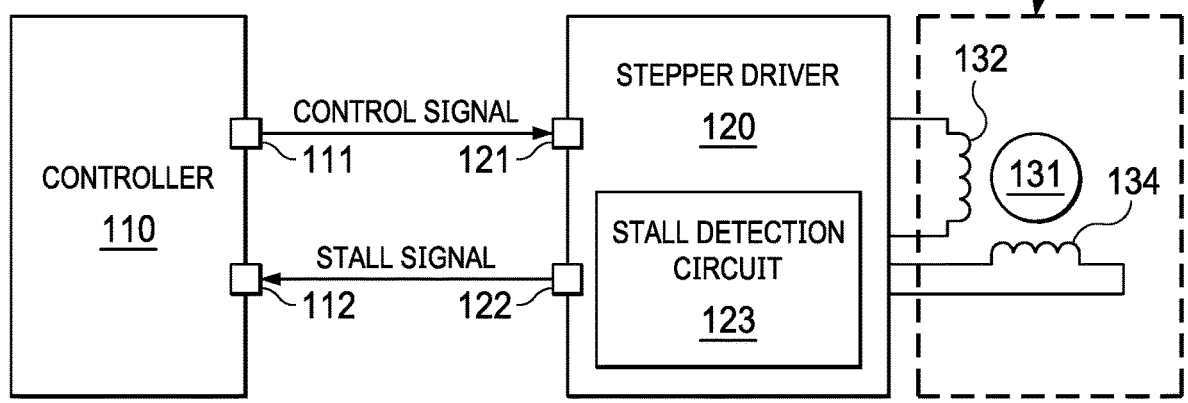
FIG. 1 is a block diagram of an example stepper motor system.

Stepper motors may be operated/driven using a controller whereby the controller provides drive signals that selectively activate/drive one or more of the stepper coils. The drive signals may be a continuous signal (e.g., a sinusoidal signal) or a series of discrete or pulsed signals (e.g., a series of pulses that have a duty cycle). To control the speed and power/torque of the stepper motor, the duty cycle may be changed (e.g., by varying the width of the pulses or by varying the frequency of the pulses) during operation of the stepper motor. Stepper motors provide position control by partitioning one cycle (e.g., 360-degrees) of mechanical rotation into a number of equal step positions (e.g., 4, 16, and/or 256). Stepper motors operate in an open loop configuration in which the stepper motors do not provide any position feedback. That lack of position feedback may be problematic when a stepper motor encounters an operating condition (e.g., a stall condition and/or an overload condition) that obstructs further rotational movement. For example, continuing to drive the stepper motor in an operating condition that obstructs further rotational movement may involve negative impacts like overheating, increased vibrations, increased noise, system damage (e.g., damage to the stepper motor and/or damage associated with a mechanical load coupled to the stepper motor). It may be advantageous to provide a mechanism for detecting an operating condition of a stepper motor without position feedback to avoid such negative impacts.

One approach to detecting an operating condition (e.g., a stall condition and/or an overload condition) of a stepper motor that obstructs further rotational movement without position feedback involves external Hall sensors. While effective, adding external components to detect stepper motor operating conditions increases system costs, complexity, and/or size. Another such approach involves monitoring a relative phase angle difference between a back electromotive force voltage ($V_{Bemf}$) waveform and a coil current waveform. However, non-sinusoidal behavior by $V_{Bemf}$ may negatively impact an accuracy of determining stepper motor operating conditions in some instances.

Aspects of this description relate to a stepper driver that includes integrated stall detection functionality for stepper motors. Providing integrated stall detection functionality within a stepper driver avoids increased system costs, complexity, and/or size associated with adding external components. In at least one example, the stepper driver includes a stall detection circuit that determines an operating condition of the stepper motor by monitoring power transferred to the stepper motor through a duty cycle of pulse width modulation (PWM) operation. The duty cycle of PWM operation may be unimpacted by non-sinusoidal behavior. Monitoring power transferred to the stepper motor through a duty cycle of PWM operation may mitigate negative impacts on accuracy associated with non-sinusoidal behavior.

FIG. 1 is a block diagram of an example stepper motor system 100. At least some implementations of the system 100 are representative of an application environment for a stepper driver with PWM duty cycle monitoring for stall detection during open-loop operation of stepper motors. Example application environments may include, but are not limited to: industrial applications (e.g., valve motors, printers, scanners, textile machines, automated teller machines) and automotive applications (e.g., automotive head-light motors, and/or heads-up displays). The system 100 can include a controller 110 having a controller output 111 and a controller input 112. Controller 110 may be implemented by a microcontroller, a processor, a microcomputer, digital circuitry, analog circuitry, field programmable gate array, an application specific integrated circuit, memory and/or software. The system 100 can also include a stepper driver 120 having a driver input 121 adapted to be coupled to the controller output 111, a driver output 122 adapted to be coupled to the controller input 112, and a stall detection circuit 123. Stepper driver 102 may be implemented by analog circuitry (e.g., one or more amplifiers, transistors, power devices, etc.) and/or digital circuitry (e.g., logic circuitry). The controller input 111 and/or the controller output 112 may be connected to a single conductor or a multi-conductor bus to facilitate communications with stepper driver 120. The system 100 can also include a stepper motor 130 having a rotor 131, a first coil 132, and a second coil 134. A spatial separation may be provided by orthogonally arranging the first coil 132 and the second coil 134 about the rotor 131 so that a 90-degrees angle exists between the first coil 132 and the second coil 134. In alternative examples, more than two coils are used to operate/drive the stepper motor 130. In such alternative examples, the coils may be separated by different angles.

In an example operation of the system 100, a control signal provided by the controller output 111 may be received at the driver input 121. The control signal may include a STEP signal and a direction (DIR) signal. The STEP signal may include an integer number of pulses. Each pulse of the STEP signal may have a rising edge that causes the stepper driver 120 to advance a rotational (or mechanical) position of the rotor 131 by one step. The DIR signal may define a direction, such as clockwise or counter-clockwise, of rotational (or mechanical) movement to advance the rotational position of the rotor 131. The stepper driver 120 is configured to, responsive to the control signal provided at the driver input 121, control or regulate coil current flowing through the first coil 132 and the second coil 134 to induce rotational movement of the rotor 131. For purposes of this description, current control or regulation by the stepper driver 120 with respect to one coil of the stepper motor 130 is an example of current control or regulation by the stepper driver 120 with respect to each coil of the stepper motor 130.

Controlling the respective coil currents flowing through the first coil 132 and the second coil 134 may involve the stepper driver 120 controlling PWM operation of an H-bridge circuit (e.g., H-bridge circuit 400 of FIG. 4) adapted to be coupled to each coil of the stepper motor 130. In at least one example, the stepper driver 120 may further comprise a gate driver (not shown) configured to control the PWM operation of the H-bridge circuit responsive to the control signal provided at the driver input 121. Controlling PWM operation of the H-bridge circuit is described in greater detail below with respect to FIG. 4. The stall detection circuit 123 is configured to monitor power transferred to the stepper motor through a duty cycle of the PWM operation, as described in greater detail below. The stall detection circuit 123 is further configured to provide a stall signal indicative of an operating condition of the stepper motor 130 based on such monitoring. The stall signal may facilitate communicating faulty behavior (e.g., the operating condition of the stepper motor 130 is a stall condition) to the controller 110. In at least one example, the control signal provided at the driver input 121 of the stepper driver 120 varies responsive to the stall signal transitioning to a value indicative of the operating condition of the stepper motor 130 being the stall condition. By way of example, a value of the DIR signal may define a different direction to mitigate the stall condition. As another example, the controller 110 may refrain from providing additional pulses via the STEP signal to mitigate the stall condition. As another example, the control signal provided at the driver input 121 may define a different (e.g., reduced) level of coil current for the first coil 132 and/or the second coil 134 to save power or reduce thermal problems (e.g., overheating).

Figure 2:
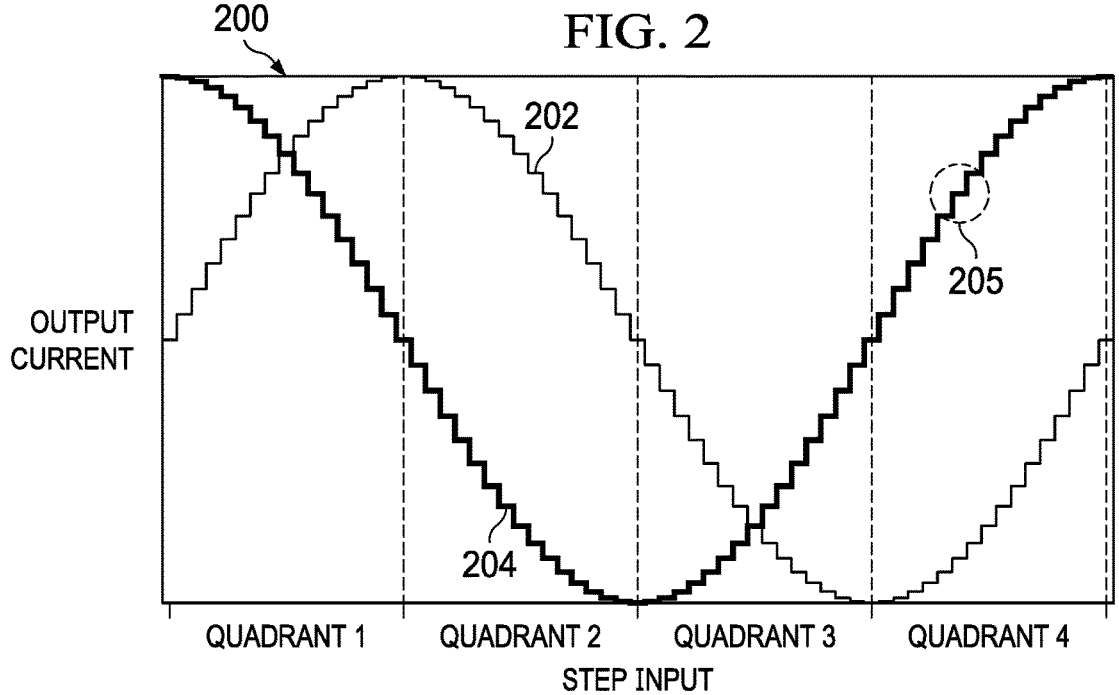
FIG. 2 is a diagram of example sinusoidal coil currents, as a function of step position, in accordance with various examples.

FIG. 2 is a diagram 200 of example sinusoidal coil currents, as a function of step position, in accordance with various examples. The diagram 200 includes waveforms 202 and 204. Waveform 202 is one cycle of a first coil current ($I_{m\_1}$) through the first coil 132 of the stepper motor 130 that corresponds to rotational movement of the rotor 131. Waveform 204 is one cycle of a second coil current ($I_{m\_2}$) through the second coil 134 of the stepper motor 130 that corresponds to 360-degrees of rotational movement of the rotor 131. In at least one example, a relationship exists between a pole-pair construction of the stepper motor 130 and the rotational movement of the rotor 131 corresponding to the one cycle of coil current represented by waveforms 202 and/or 204. In this example, one cycle of coil current represented by waveforms 202 and/or 204 may correspond to 360-degrees of rotational movement for a given pole-pair construction or a fraction of 360-degrees of rotational movement for another pole-pair construction. A phase separation of 90-degrees exists between $I_{m\_1}$ and $I_{m\_2}$. In at least one example, the stepper driver 120 may provide the phase separation of 90-degrees by controlling $I_{m\_1}$ through the first coil 132 and $I_{m\_2}$ through the second coil 134 to approximate a sine wave and a cosine wave, respectively. Along with the spatial separation provided by orthogonally arranging the first coil 132 and the second coil 134 about the rotor 131, the phase separation of 90-degrees may facilitate inducing rotational movement of the rotor 131 by creating a rotating magnetic field for the rotor 131 to follow.

$I_{m\_1}$ and $I_{m\_2}$ may each be formed as a series of discrete steps (e.g., step 205). Each step in the series of discrete steps corresponds to a different rotational position of the rotor 131. The stepper driver 120 controls $I_{m\_1}$ and $I_{m\_2}$ at each step with the phase separation of 90-degrees to induce rotational movement of the rotor 131 to a particular rotational position corresponding to that step. If one cycle of a coil current $I_m$ (e.g., $I_{m\_1}$ and/or $I_{m\_2}$) corresponds to 360-degrees of rotational movement, each quadrant of the coil current $I_{m\_1}$ may correspond to 90-degrees of rotational movement of the rotor 131. In at least one example, each quadrant of the coil current $I_{m\_1}$ may correspond to different degrees of rotational movement of the rotor 131 based on a pole-pair construction of the stepper motor 130. In the example of FIG. 2, each quadrant of $I_{m\_1}$ and $I_{m\_2}$ is partitioned into sixteen steps. By controlling the coil current $I_{m\_1}$ to transition between adjacent steps, the stepper driver 120 may induce approximately 5.625-degrees (90-degrees/16 steps) of incremental rotational movement of the rotor 131. Transitioning between adjacent steps of waveforms 202 and/or 204 in a stair-stepped upward direction (e.g., waveform 202 in a direction from the y-axis towards the transition between Quadrant 1 and Quadrant 2) may involve increasing the coil current $I_m$. Transitioning between adjacent steps of waveforms 202 and/or 204 in a stair-stepped downward direction (e.g., waveform 202 in a direction from the transition between Quadrant 1 and Quadrant 2 towards the y-axis) may involve decreasing the coil current $I_m$. In other examples, each quadrant of $I_{m\_1}$ and/or $I_{m\_2}$ may be partitioned into less steps (e.g., two steps) or more steps (e.g., 256 steps) for coarser or finer rotational position control of the rotor 131, respectively.

Figure 3:
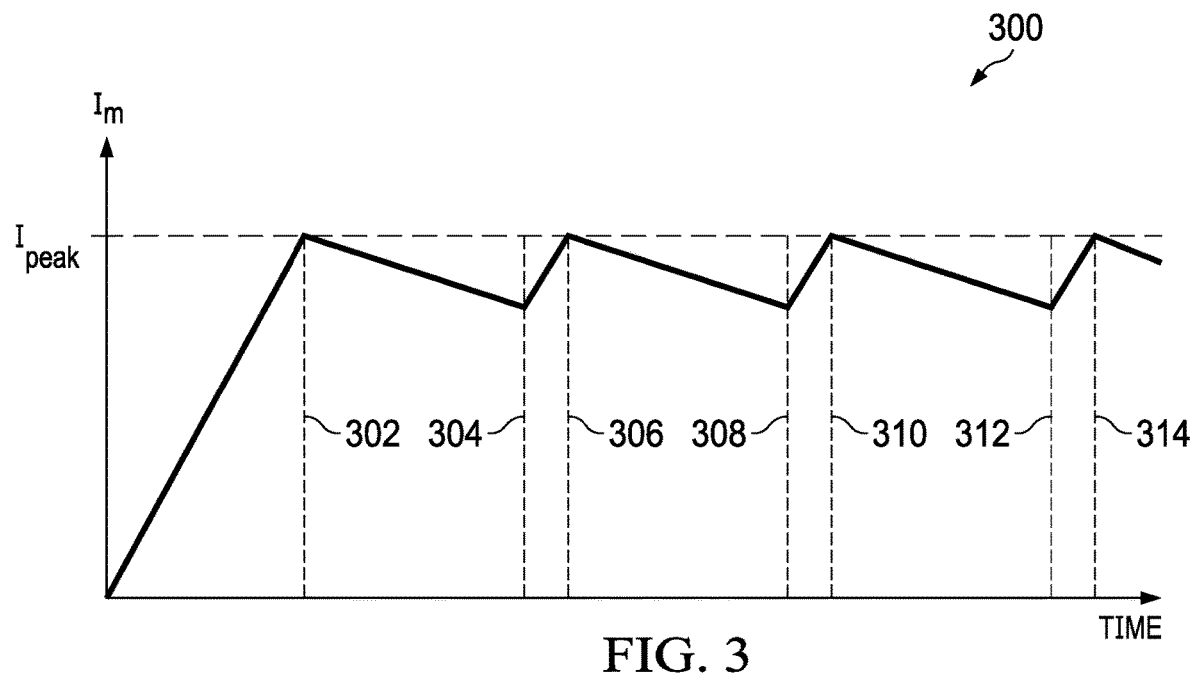
FIG. 3 is a diagram of coil current at a given step as a function of time, in accordance with various examples.

FIG. 3 is a diagram 300 of the coil current $I_{m\_1}$ (e.g., $I_{m\_1}$ and/or $I_{m\_2}$) at a given step (e.g., step 205 of FIG. 2) as a function of time, in accordance with various examples. As shown by the diagram 300, the stepper driver 120 may implement multiple cycles of PWM operation at each step of the coil current $I_m$. Implementing multiple cycles of PWM operation at each step of the coil current $I_m$ may involve peak current regulation by the stepper driver 120. Peak current regulation may involve the stepper driver 120 setting a peak coil current ($I_{peak}$) for the given step responsive to detecting an edge (e.g., a rising edge, a falling edge, and/or both) of a STEP signal provided by the controller 110. Responsive to determining that the coil current $I_{m\_1}$ is less than $I_{peak}$, the stepper driver 120 activates a pair of transistors within an H-bridge circuit (e.g., the H-bridge circuit 400 of FIG. 4) to implement a drive (DRV) mode. Implementing the DRV mode increases the coil current $I_m$. When the coil current $I_{m\_1}$ reaches $I_{peak}$, the stepper driver 120 activates a different pair of transistors within the H-bridge circuit to implement a decay mode (e.g., a fast decay (FD) mode or a slow decay (SD) mode). Implementing the decay mode decreases the coil current $I_m$. The stepper driver 120 induces the rotor 131 to remain at a rotational position corresponding to the given step until another rising edge of the STEP signal is detected by controlling the H-bridge circuit to alternate between the DRV and decay modes. In FIG. 3, the stepper driver 120 implements the DRV mode: prior to time 302; between time 304 and time 306; between time 308 and time 310; and between time 312 and time 314. In FIG. 3, the stepper driver 120 implements the decay mode: between time 302 and time 304; between time 306 and time 308; between time 310 and time 312; and subsequent to time 314.

Figure 4:
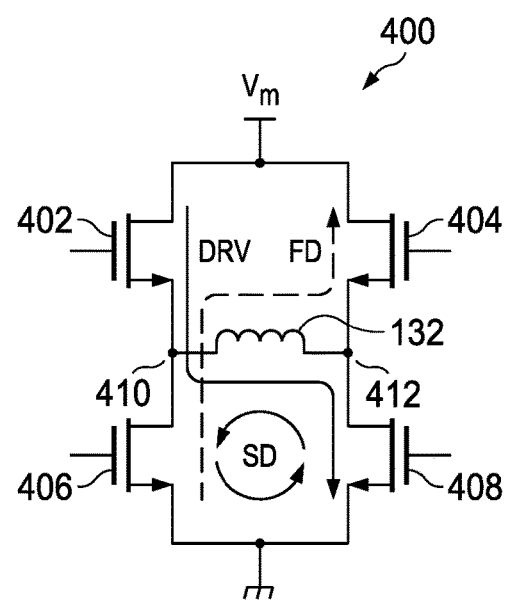
FIG. 4 is a schematic diagram of an example implementation of an H-bridge circuit.

FIG. 4 is a schematic diagram of an example implementation of an H-bridge circuit 400 that, in some examples, may be incorporated into stepper driver 120 (FIG. 1). In at least one example, the stepper driver 120 of FIG. 1 may further comprise a gate driver (not shown) configured to control the PWM operation of the H-bridge circuit 400 responsive to the control signal provided at the driver input 121. The H-bridge circuit 400 includes a first transistor 402, a second transistor 404, a third transistor 406, and a fourth transistor 408. In the example of FIG. 4, each transistor comprises an n-type field-effect transistor (NFET). In other examples, one or more transistors of the H-bridge circuit 400 may comprise another switching device, such as a p-type field-effect transistor (PFET), a metal-oxide-semiconductor field-effect transistor (MOSFET), or a bipolar junction transistor (BJT). The first transistor 402 and the second transistor 404 may be high side transistors. The third transistor 406 and the fourth transistor 408 may be low side transistors. The H-bridge circuit 400 also includes a first output node 410 and a second output node 412 that are adapted to be coupled to opposing sides of the first coil 132 of the stepper motor 130. The second coil 134 of the stepper motor 130 is adapted to be coupled to output nodes of a separate H-bridge circuit (not shown). In some examples where stepper motor 130 utilizes multiple coils, each coil may be connected to different H-bridge circuits.

In an example architecture of the H-bridge circuit 400, a drain of the first transistor 402 is adapted to be coupled to a drain of the second transistor 404 and is adapted to be coupled to a supply voltage $V_m$. A source of the first transistor 402 is coupled to the first output node 410 and to a drain of the third transistor 406. A source of the second transistor 404 is coupled to the second output node 412 and to a drain of the fourth transistor 408. A source of the third transistor 406 is coupled to a source of the fourth transistor 408 and is adapted to be coupled to a common potential (e.g., ground). A gate of each transistor of the H-bridge circuit 400 is adapted to be coupled to a gate driver (not shown) of the stepper driver 120 of FIG. 1. The gate driver(s) incorporated into stepper driver 120 selectively turn on/off transistors 402, 404, 406 and/or 408 based on the control signal received at terminal 121 so as to operate/drive stepper motor 130. The gate of each of transistors 402, 404, 406 and/or 408 may be connected to a separate gate driver or one gate driver may be connected to the gates of one or more of the transistors 402, 404, 406 and/or 408.

The stepper driver 120 is configured to independently activate each transistor of the H-bridge circuit 400 via the respective gates to implement one of three conduction modes for controlling $I_{m\_1}$ through the first coil 132 of the stepper motor 130. The three conduction modes may include the DRV mode, the FD mode, and the SD mode. In the following description, transistors that are not identified to be activated (e.g., turned on) are deactivated (e.g., turned off). To implement the DRV mode, the stepper driver 120 may activate the first transistor 402 and the fourth transistor 408 to drive the coil current $I_{m\_1}$ from the supply voltage $V_m$ to ground through the first transistor 402, the first coil 132, and the fourth transistor 408, as represented by the solid arrow (marked as "DRV" in FIG. 4). During the DRV mode, the coil current $I_{m\_1}$ may increase in the first coil 132 at a rate of $V_m/L$, where L is an inductance of the first coil 132. In at least one example, the coil current $I_{m\_1}$ may increase in the first coil 132 at a rate of $(V_m-V_{bemf})/L$ during the DRV mode when $V_{bemf}$ is present at the first coil 132. When a value of the coil current $I_{m\_1}$ meets or exceeds a value of a peak coil current $I_{peak}$, the DRV mode may be turned off by the stepper driver 120 by deactivating (e.g., turning off) the first transistor 402 and the fourth transistor 408.

To implement the FD mode, the stepper driver 120 may activate the second transistor 404 and the third transistor 406. In the FD mode, responsive to the inductance of the first coil 132, the coil current $I_{m\_1}$ may flow from ground to the supply voltage $V_m$ through the third transistor 406, the first coil 132, and the second transistor 404, as represented by the dashed arrow (marked as "FD" in FIG. 4). During the FD mode, the coil current $I_{m\_1}$ may decay at a rate of $-V_m/L$. In at least one example, the coil current $I_{m\_1}$ may decay at a rate of $-(V_m-V_{bemf})/L$ during the FD mode when $V_{bemf}$ is present at the first coil 132. To implement the SD mode, the stepper driver 120 may activate the third transistor 406 and the fourth transistor 408. In the SD mode, responsive to the inductance of the first coil 132 (e.g., energy stored in the coil or energy created in the coil by the continued movement of the rotor of stepper motor 130), the coil current $I_{m\_1}$ may flow from ground to ground through the third transistor 406, the first coil 132, and the fourth transistor 408, as represented by the circular arrow (marked as "SD" in FIG. 4). During the SD mode, the coil current $I_{m\_1}$ may decay at a rate that is less than a rate at which the coil current in the first coil 132 decays during the FD mode. In alternative embodiments, transistors 404 and 406 may be activated (turned on), thereby causing current to flow from voltage source $V_m$ to ground (through coil 132), to cause the motor to operate in the opposite direction (and to cause $I_{m\_1}$ to flow in the opposite direction through coil 132) as discussed with reference to the DRV operation above. In these alternative embodiments, the FD mode would be implemented by activating (turning on) transistors 402 and 408, and the SD mode would be implemented as is described above.

Figure 5:
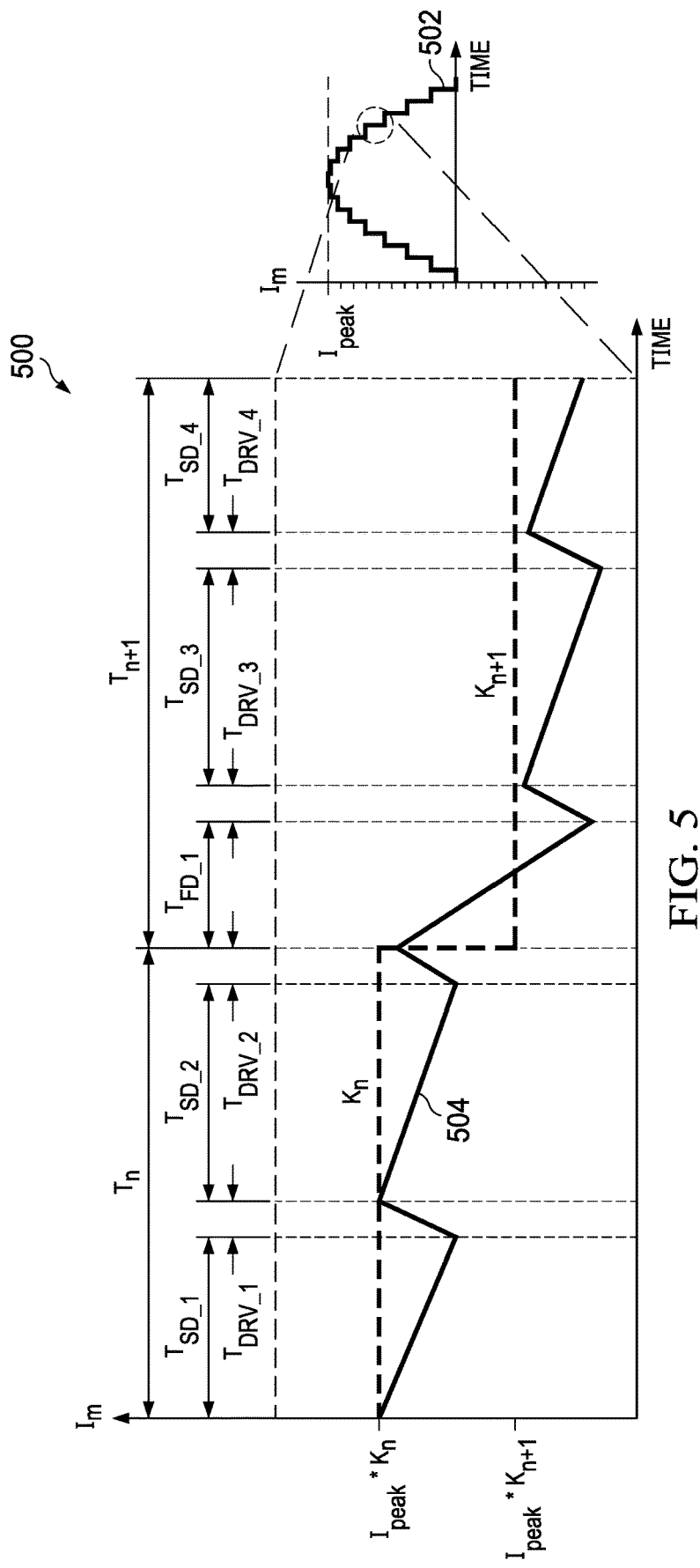
FIG. 5 is a diagram of coil current as a function of time, in accordance with various examples.

FIG. 5 is a diagram 500 of coil current $I_m$ (e.g., $I_{m\_1}$ and/or $I_{m\_2}$) as a function of time, in accordance with various examples. The diagram 500 includes waveform 502 and waveform 504. Waveform 502 illustrates a half-cycle of the coil current $I_m$. In at least one example, waveform 502 represents waveform 202 (e.g., $I_{m\_1}$) of FIG. 2 at Quadrant-1 and Quadrant-2. In at least one example, waveform 502 represents waveform 204 (e.g., $I_{m\_2}$) of FIG. 2 at Quadrant-4 and Quadrant-1. Waveform 504 illustrates the coil current $I_m$ of adjacent steps (e.g., step n and step n+1) within the half-cycle of the coil current $I_m$. In FIG. 5, a duration of step n within the coil current $I_m$ is represented by $T_n$ and a duration of step n+1 is represented by $T_{n+1}$.

Waveform 504 shows scaling of $I_{peak}$ at each step of the coil current $I_m$ by the stepper driver 120 to induce incremental rotational movement of the rotor 131. The stepper driver 120 may scale $I_{peak}$ at each step of the coil current $I_m$ using different step coefficients. The stepper driver 120 may scale $I_{peak}$ at step n of the coil current $I_m$ using step coefficient $K_n$. In at least one example, step coefficient $K_n$ is determined by $sin((90°/M)*n)$, where M denotes a total number of steps in a quadrant of the half-cycle (or one quarter-cycle) of the coil current $I_m$. Each quadrant of the half-cycle of the coil current $I_m$ of waveform 502 is divided into eight steps. As such, the step coefficient $K_n$ for step n of waveform 502 may be determined by $\sin((90°/8)*n)$. The stepper driver 120 may set a new peak coil current for step n ($I_{peak\_n}$) using the step coefficient $K_n$ to scale $I_{peak}$ for step n. In at least one example, a relationship between $I_{peak\_n}$ and $I_{peak}$ is determined by: $I_{peak\_n} = I_{peak}*K_n$.

Prior to $T_{n+1}$, the stepper driver 120 may detect a rising edge of the STEP signal provided by the controller 110. The DIR signal provided by the controller 110 when the stepper driver 120 detects the rising edge of the STEP signal may define a direction of rotational movement for the rotor 131. In the example of FIG. 5, the DIR signal defines the direction of rotational movement for the rotor 131 that advances the rotor 131 from a rotational position corresponding to step n to a rotational position corresponding to step n+1. Responsive to detecting the rising edge of the STEP signal, the stepper driver 120 may induce rotational movement of the rotor 131 to the rotational position corresponding to step n+1. Inducing rotational movement of the rotor 131 to the rotational position corresponding to step n+1 may involve the stepper driver 120 setting a new peak coil current for step n+1 ($I_{peak\_n+1}$). The stepper driver may set $I_{peak\_n+1}$ using the step coefficient $K_{n+1}$ to scale $I_{peak}$ for step n+1.

In another example, the DIR signal may specify an opposite direction of rotational movement for the rotor 131. That opposite direction of rotational movement may advance the rotor 131 from a rotational position corresponding to step n to a rotational position corresponding to step n−1. In this example, the stepper driver 120 may induce rotational movement of the rotor 131 to the rotational position corresponding to step n−1 by setting a new peak coil current for step n−1 ($I_{peak\_n-1}$). The stepper driver may set $I_{peak\_n-1}$ using the step coefficient $K_{n-1}$ to scale $I_{peak}$ for step n−1.

Waveform 504 also shows that, within a duration of each step, the stepper driver 120 may implement different combinations of conduction modes to control the coil current $I_m$. Within time $T_n$ of waveform 504, the stepper driver 120 implements the SD mode twice (e.g., one instance for a duration of $T_{SD\_1}$ and another instance for a duration of $T_{SD\_2}$) and the DRV mode twice (e.g., one instance for a duration of $T_{DRV\_1}$ and another instance for a duration of $T_{DRV\_2}$). The stepper driver 120 does not implement the FD mode within $T_n$ of waveform 504. Within time $T_{n+1}$ of waveform 504, the stepper driver 120 implements the FD mode once (e.g., for a duration of $T_{FD\_1}$), the SD mode twice (e.g., one instance for a duration of $T_{SD\_3}$ and another instance for a duration of $T_{SD\_4}$) and the DRV mode twice (e.g., one instance for a duration of $T_{DRV\_3}$ and another instance for a duration of $T_{DRV\_4}$).

In addition to implementing different combinations of conduction modes within a duration of each step to control the coil current $I_m$, the stepper driver 120 may implement a given conduction mode for different durations. Within $T_n$ of waveform 504, the stepper driver 120 implements the SD mode one instance for the duration of $T_{SD\_1}$ and another instance for the duration of $T_{SD\_2}$ that is greater than the duration of $T_{SD\_1}$.

A cycle of PWM operation at an H-bridge circuit (e.g., H-bridge circuit 400 of FIG. 4) may comprise a combination of conduction modes implemented by the stepper driver 120 that includes one implementation of the DRV mode. In at least one example, the stepper driver 120 can implement the combination of conduction modes for the H-bridge circuit without regards to (e.g., independently from) a combination of conduction modes that the stepper driver 120 implements for another H-bridge circuit (e.g., an H-bridge circuit coupled to the second coil 134 of FIG. 1). A given step of the coil current $I_m$ may include multiple cycles of PWM operation at the H-bridge circuit. By way of example, step n of the coil current $I_m$ represented by waveform 504 includes two cycles of PWM operation at the H-bridge circuit. One cycle of PWM operation includes the implementation of the SD mode for the duration of $T_{SD\_1}$ and the implementation of the DRV mode for the duration of $T_{DRV\_1}$. Another cycle of PWM operation includes the implementation of the SD mode for the duration of $T_{SD\_2}$ and the implementation of the DRV mode for the duration of $T_{DRV\_2}$.

In at least one example, a duty value for one cycle of PWM operation within a given step of the coil current $I_m$ may be determined according to:

$$(T_{DRV} - T_{FD})/(T_{DRV} + T_{FD} + T_{SD}) \quad (1)$$

In accordance with this example, a duty cycle of the first cycle of PWM operation within step n of the coil current $I_m$ represented by waveform 504 may be determined according to:

$$(T_{DRV\_1} - 0)/(T_{DRV\_1} + 0 + T_{SD\_1}) \quad (2)$$

A value of zero may be used for $T_{FD}$ in determining the duty cycle of that first cycle of PWM operation inasmuch as that first cycle of PWM operation does not include an implementation of the FD mode. In at least one example, an effective duty cycle value for a given step of the coil current $I_m$ may be determined according to:

$$(\Sigma T_{DRV} - \Sigma T_{FD})/T_{step} \quad (3)$$

where $\Sigma T_{DRV}$ denotes a cumulative drive time within the given step, $\Sigma T_{FD}$ denotes a cumulative fast decay time within the given step, and $T_{step}$ denotes a duration of the given step. In accordance with this example, an effective duty cycle value for step n+1 of the coil current $I_m$ represented by waveform 504 may be determined according to:

$$[(T_{DRV\_3} + T_{DRV\_4}) - T_{FD\_1}]/T_{n+1} \quad (4)$$

Figure 6:
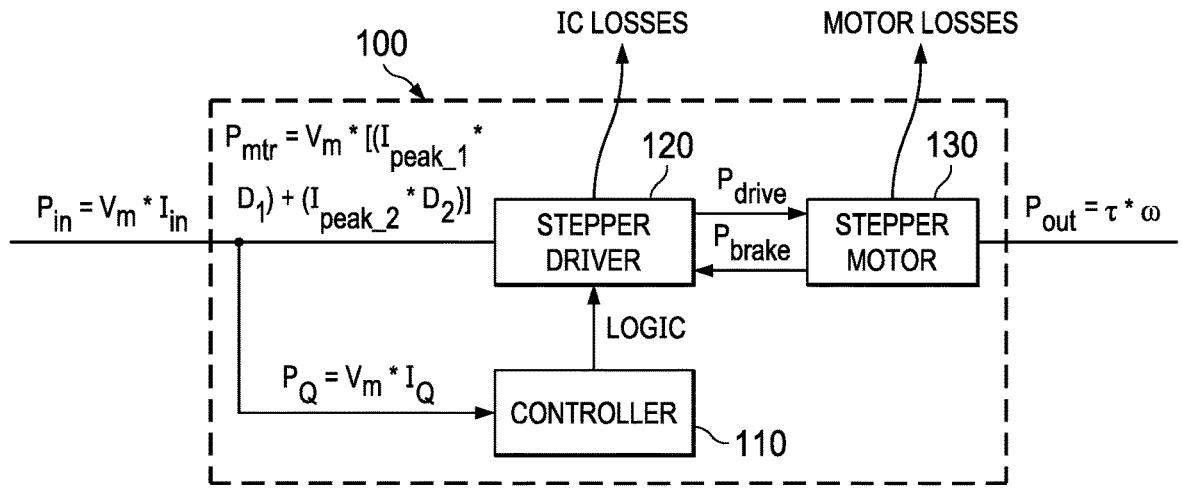
FIG. 6 is a block diagram illustrating power transfer within the system, in accordance with various examples.

FIG. 6 is a block diagram illustrating power transfer within the system 100, in accordance with various examples. In operation, the system 100 converts input power $P_{in}$ provided to the system 100 as electrical energy into mechanical energy that the system 100 delivers to a mechanical load coupled to the stepper motor 130 as output power $P_{out}$. An electrical energy source (e.g., a voltage rail connected to an alternating current power supply, a voltage regulator, a direct current power supply and/or a battery) may provide the input power $P_{in}$ to the system 100 as a product of an input current $I_{in}$ and the supply voltage $V_m$. The output power $P_{out}$ that the system 100 delivers is a product of load torque $\tau_L$ and an angular velocity $\omega$ of the rotor 131 of the stepper motor 130.

The system 100 may provide a non-zero portion of the input power $P_{in}$ to the controller 110. That non-zero portion of the input power $P_{in}$ may, at least, include a quiescent power $P_Q$ provided to the controller 110 as a product of a quiescent current $I_Q$ and the supply voltage $V_m$. The portion of the input power $P_{in}$ supplied to the controller 110 may slightly increase as the controller 110 draws additional current to provide logic input (e.g., the control signal) to the stepper driver 120. The remaining portion of the input power $P_{in}$ is provided by the system 100 to the stepper driver 120 as motor power $P_{mtr}$. In at least one example, the motor power $P_{mtr}$ may be determined according to:

$$V_m * [(I_{peak\_1} * + D_1) + (I_{peak\_2} * D_2)] \quad (5)$$

where $I_{peak\_1}$ denotes a peak coil current for the first coil 132, $D_1$ denotes an effective duty cycle value for one-half cycle of $I_{m\_1}$, $I_{peak\_2}$ denotes a peak coil current for the second coil 134, and $D_2$ denotes an effective duty cycle value for one-half cycle of $I_{m\_2}$. The motor power $P_{mtr}$ provided to the stepper driver 120 may be partitioned among the output power $P_{out}$, IC losses (e.g., drain-source on resistance (RDSon) losses, switching losses, and/or other resistive losses) at the stepper driver 120, and/or motor losses (e.g., direct current resistance (DCR) losses, damping losses, and/or other resistive or inertial losses) at the stepper motor 130.

FIG. 6 shows that power transfer exists between the stepper driver 120 and the stepper motor 130. Such power transfer between the stepper driver 120 and the stepper motor 130 relates to the stepper driver 120 controlling the coil current $I_m$ (e.g., $I_{m\_1}$ and/or $I_{m\_2}$) of the stepper motor 130 to induce rotational movement of the rotor 131. Different conduction modes implemented by the stepper driver 120 to control the coil current $I_m$ of the stepper motor 130 have different impacts on power transfer between the stepper driver 120 and the stepper motor 130. Implementing the DRV mode to control the given coil current transfers power (represented by $P_{drive}$) from the stepper driver 120 towards the stepper motor 130. One aspect of $P_{drive}$ may involve the given coil current flowing from the supply voltage $V_m$ to ground responsive to the stepper driver 120 implementing the DRV mode. Implementing the FD mode to control the given coil current transfers power (represented by $P_{brake}$) from the stepper motor 130 towards the stepper driver 120. One aspect of $P_{brake}$ may involve the given coil current flowing from ground to the supply voltage $V_m$ responsive to the stepper driver 120 implementing the FD mode. Implementing the SD mode to control the given coil current recirculates within an H-bridge circuit (e.g., H-bridge circuit 400 of FIG. 4) of the stepper driver 120. Recirculation of the given coil current within the H-bridge circuit reduces or substantially eliminates power transfer between the stepper driver 120 and the stepper motor 130. Accordingly, monitoring PWM operations corresponding to the different conduction modes that the stepper driver 120 implements at the H-bridge circuit may be useful in determining power transfer within the system 100.

Figure 7:
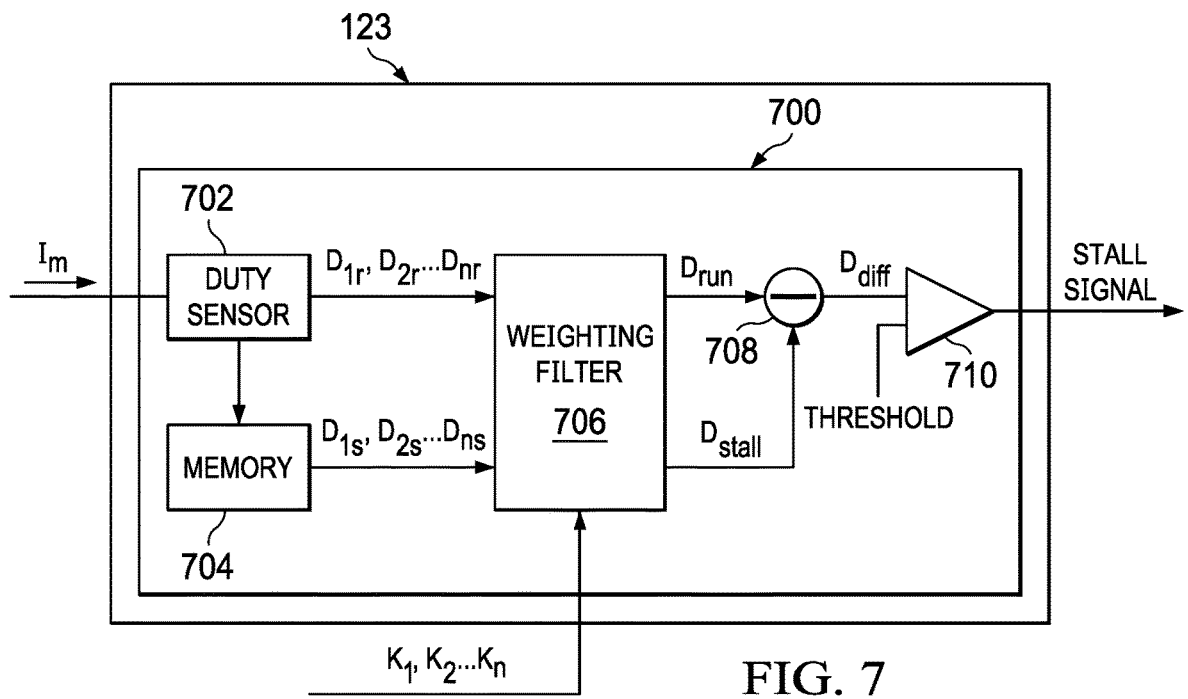
FIG. 7 is a block diagram of an example circuit that is useful to implement aspects of the stall detection circuit of some examples.

FIG. 7 is a block diagram of an example circuit 700 that is useful to implement aspects of the stall detection circuit 123. In at least some examples, the stall detection circuit 123 can include a duty sensor 702, memory 704, a weighting filter 706, a subtractor 708, and a comparator 710. Stall detection circuit 123 may be implemented using digital circuitry, analog circuitry, memory, a processor, software and/or a combination of any of the above. An input of the duty sensor 702 is adapted to be coupled to an output node (e.g., output nodes 410 and/or 412 of FIG. 4) of an H-bridge circuit of the stepper driver 120. The H-bridge circuit is adapted to be coupled to a coil (e.g., the first coil 132 and/or the second coil 134) of the stepper motor 130. An output of the comparator 710 is adapted to be coupled to the driver output 122 of the stepper driver 120.

The duty sensor 702 is configured to, responsive to a coil current $I_m$ (e.g., $I_{m\_1}$ and/or $I_{m\_2}$ provided at the output node of the H-bridge circuit, provide raw duty data (e.g., $D_1$, $D_2 \ldots , D_n$; where $D_n$ denotes an effective duty cycle value at step-n of the coil current $I_m$). In at least one example, an effective duty cycle value (e.g., $D_n$) at a given step (e.g., step-n) of the coil current $I_m$ may be determined by equation (3). In at least one example, the raw duty data provided by the duty sensor 702 includes cycle-to-cycle duty information for the coil current $I_m$ provided at the output node of the H-bridge circuit. When an operating condition of the stepper motor 130 is in a stall condition (e.g., when the coil current $I_m$ is non-zero and the angular velocity ω of the rotor 131 is zero or approximately zero), the raw duty data that the duty sensor 702 provides is raw stall duty data (e.g., $D_{1s}$, $D_{2s} \ldots , D_{ns}$; where $D_{ns}$ denotes an effective duty cycle value at step-n of the coil current $I_m$ when the operating condition of the stepper motor 130 is the stall condition). The duty sensor 702 may be further configured to store the raw stall duty data in the memory 704. In at least one example, the memory 704 comprises volatile memory, non-volatile memory, or a combination thereof. When an operating condition of the stepper motor 130 is a running condition (e.g., when the angular velocity ω of the rotor 131 is non-zero), the raw duty data that the duty sensor 702 provides is raw run duty data (e.g., $D_{1r}$, $D_{2r} \ldots , D_{nr}$; where $D_{nr}$ denotes an effective duty cycle value at step-n of the coil current $I_m$ when the operating condition of the stepper motor 130 is the running condition).

The weighting filter 706 facilitates averaging the raw duty data provided by the duty sensor 702 over a half-cycle of the coil current $I_m$ using step coefficients (e.g., $K_1$, $K_2 \ldots$, where $K_n$ denotes a step coefficient for step-n of the coil current $I_m$). In at least one example, the control signal provided at the driver input 121 further includes the step coefficients (e.g., $K_1$, $K_2 \ldots , K_n$).

The weighting filter 706 is configured to, responsive to the raw run duty data and a step coefficient $K_n$ for step-n of the coil current $I_m$, provide a run duty signal $D_{run}$. The weighting filter 706 is further configured to, responsive to the raw stall duty data and the step coefficient $K_n$ for step-n of the coil current $I_m$, provide a stall duty signal $D_{stall}$.

Mechanical energy-related aspects (e.g., the load torque $τ_L$ and/or a frictional (or default) torque $τ_d$) of power transfer within the system 100 are proportional to the angular velocity ω of the rotor 131. The mechanical energy-related aspects of power transfer within the system 100 may be reduced or become negligible when the angular velocity ω of the rotor 131 is zero or approximately zero. Electrical energy-related aspects (e.g., resistive losses R, such as DCR losses at the stepper motor 130 and RDSon losses at the stepper driver 120) of power transfer within the system 100 may be unrelated to the angular velocity ω of the rotor 131. The motor power $P_{mtr}$ provided to the stepper driver 120 when the operating condition of the stepper motor 130 is the stall condition ($P_{mtr\_stall}$) may be attributed to the electrical energy-related aspects of power transfer within the system 100. In at least one example, $P_{mtr\_stall}$ may be determined according to:

$$V_m * I_m * D_{stall} = I_m^2 * R \quad (6)$$

With the supply voltage $V_m$ and the coil current $I_m$ being measurable attributes of $P_{mtr}$ stall, the stall duty signal $D_{stall}$ may be useful to determine the electrical energy-related aspects (e.g., the resistive losses R) of power transfer within the system 100.

The mechanical energy-related and electrical energy-related aspects of power transfer within the system 100 may each be non-negligible when the angular velocity ω of the rotor 131 is non-zero. The motor power $P_{mtr}$ provided to the stepper driver 120 when the operating condition of the stepper motor 130 is the running condition ($P_{mtr\_run}$) may be attributed to both the mechanical energy-related aspects and the electrical energy-related aspects of power transfer within the system 100. In at least one example, $P_{mtr\_run}$ at a given angular velocity $\omega$ of the rotor 131 may be determined according to:

$$V_m*I_m*D_{run}=(I_m^2*R)+(\tau_L*\omega)+(\tau_d*\omega) \tag{7}$$

In at least one example, $P_{mtr}$ over a quadrant of the coil current $I_m$ without averaging the duty signal provided by the duty sensor 702 may be determined according to:

$$V_m*[I_1*D_1+I_2*D_2+I_n*D_n] \tag{8}$$

where $I_n$ and $D_n$ denote the coil current $I_m$ and effective duty cycle value at step-n, respectively. In this example, determining $P_{mtr}$ over a quadrant of the coil current $I_m$ without averaging the duty signal provided by the duty sensor 702 may involve determining a value of the coil current $I_m$ at each step of sinusoidal current regulation by the stepper driver 120. In at least one example, $P_{mtr}$ over a quadrant of the coil current $I_m$ with averaging of the duty signal provided by the duty sensor 702 may be determined according to:

$$V_m*I_{peak}*[K_1*D_1+K_2*D_2+K_n*D_n] \tag{9}$$

In this example, with averaging the duty signal and with each quadrant of the coil current $I_m$ being partitioned into four steps (e.g., ¼ micro-step current regulation), $P_{mtr}$ over a half-cycle of the coil current $I_m$ may be determined according to:

$$V_m*I_{peak}*[0.383*D_1+0.707*D_2+0.924*D_3+D_4+\\0.924*D_5+0.707*D_6+0.383*D_7] \tag{10}$$

When averaging the duty signal provided by the duty sensor 702, $P_{mtr}$ over a quadrant of the coil current $I_m$ may be determined without determining a value of the coil current $I_m$ at each step of sinusoidal current regulation by the stepper driver 120. In at least one example, the weighting filter 706 may be omitted from the circuit 700.

The subtractor 708 is configured to, responsive to the run duty signal $D_{run}$ and the stall duty signal $D_{stall}$, provide a differential duty signal $D_{diff}$. As described above, the stall duty signal $D_{stall}$ may be useful to determine the electrical energy-related aspects (e.g., the resistive losses R) of power transfer within the system 100. In contrast, $P_{mtr\_run}$, may be attributed to both the mechanical energy-related aspects (e.g., the load torque $\tau_L$ and/or the frictional torque $\tau_d$) and the electrical energy-related aspects of power transfer within the system 100. Deducting the stall duty signal $D_{stall}$ from the run duty signal $D_{run}$ (an element of $P_{mtr\_run}$) to provide the differential duty signal $D_{diff}$ may facilitate distinguishing the electrical energy-related aspects of $P_{mtr\_run}$ from the mechanical energy-related aspects. Accordingly, the differential duty signal $D_{diff}$ may facilitate indirectly determining the mechanical energy-related aspects of power transfer within the system 100 independent of the electrical energy-related aspects.

By way of example, $P_{mtr\_run}$ at a given angular velocity $\omega$ of the rotor 131 may be determined by equation (7). The electrical energy-related aspects of $P_{mtr\_run}$ may relate to $(I_m^2*R)$. The mechanical energy-related aspects of $P_{mtr\_run}$ may relate to $(\tau_L*\omega)+(\tau_d*\omega)$. In at least one example, $P_{mtr\_run}$ at a given angular velocity $\omega$ of the rotor 131 without the electrical energy-related aspects of power transfer within the system 100 may be determined according to:

$$V_m*I_m*(D_{run}-D_{stall})=(\tau_L+\tau_d)*\omega \tag{11}$$

where $(D_{run}-D_{stall})$ denotes $D_{diff}$. With the supply voltage $V_m$, the coil current $I_m$, and the angular velocity $\omega$ of the rotor 131 being measurable attributes of $P_{mtr\_run}$, the differential duty signal $D_{diff}$ may be useful to determine the mechanical energy-related aspects of power transfer within the system 100 independent of the electrical energy-related aspects. Also, the differential duty signal $D_{diff}$, the supply voltage $V_m$, the coil current $I_m$, and the angular velocity $\omega$ of the rotor 131 are each independently varying attributes of $P_{mtr\_run}$. Accordingly, the differential duty signal $D_{diff}$ may be scalable with respect to: the angular velocity $\omega$ of the rotor 131, the supply voltage $V_m$, the coil current $I_m$, or a combination thereof. The comparator 710 is configured to, responsive to the differential duty signal $D_{diff}$ and a threshold value, provide a stall signal. In at least one example, the stall signal is indicative of an operating condition of the stepper motor 130 based on the run duty signal.

Figure 8:
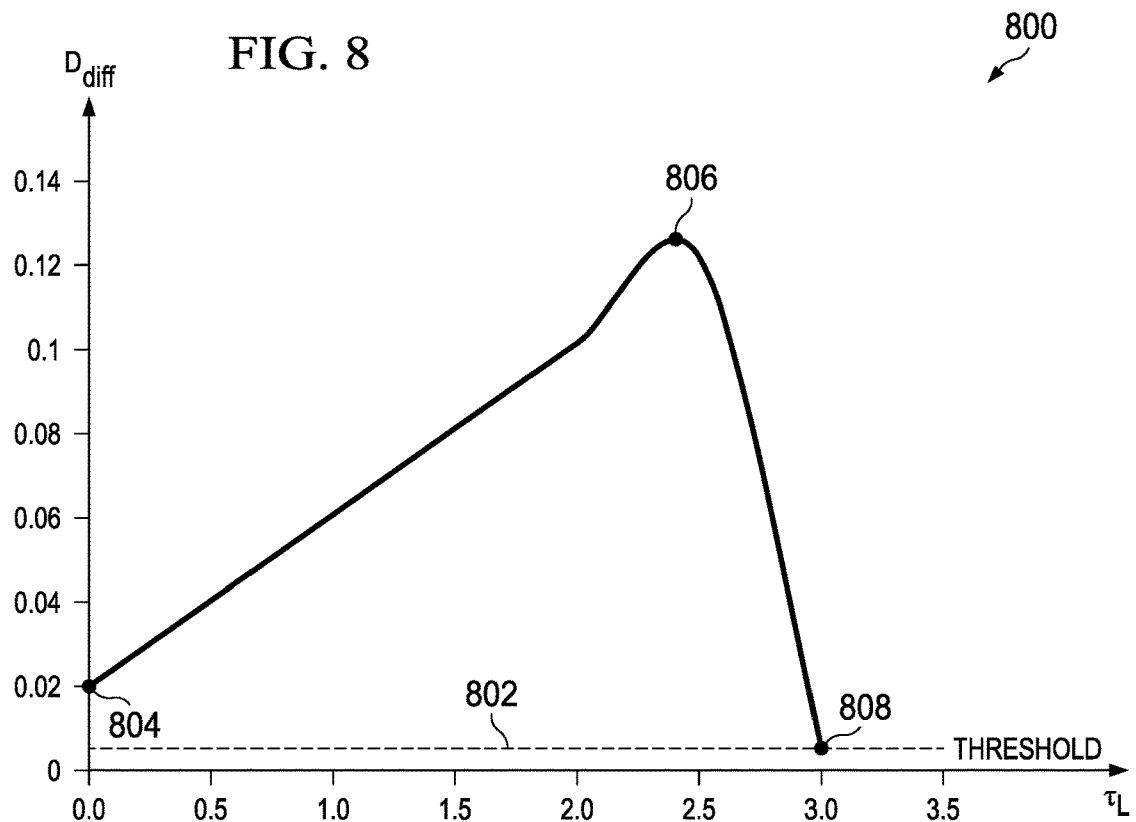
FIG. 8 is a diagram of a differential duty signal as a function of load torque, in accordance with various examples.

FIG. 8 is a diagram 800 of the differential duty signal $D_{diff}$ as a function of load torque $\tau_L$ in Newton-meter (Nm), in accordance with various examples. In at least one example, values of the differential duty signal $D_{diff}$ may be unitless. The diagram 800 represents example values of the differential duty signal $D_{diff}$ provided at an output of the subtractor 708 responsive to variations in the load torque $\tau_L$ at the stepper motor 130. A threshold value 802 (e.g., the threshold value provided at an input of the comparator 710 of FIG. 7) may be useful for monitoring such variations in the load torque $\tau_L$ at the stepper motor 130. The threshold value 802 may be: provided by a user; established during fabrication and/or testing of the devices; determined during operation of stepper motor 130; established during system integration; and/or specific stepper to the motor 130 (e.g., the brand and/or model). The differential duty signal $D_{diff}$ provided at the output of the subtractor 708 may have a value 804 indicating that an operating condition of the stepper motor 130 is a no-load condition when the load torque $\tau_L$ is zero or substantially zero Nm (e.g., at or near the threshold value 802). The threshold value 802 is below the value 804 of the differential duty signal $D_{diff}$ indicative of the no-load condition. The differential duty signal $D_{diff}$ provided at the output of the subtractor 708 may have a value 806 when the load torque $\tau_L$ at the stepper motor 130 is approximately 2.4 Nm. Values of the differential duty signal $D_{diff}$ provided at the output of the subtractor 708 between the value 804 and the value 806 may indicate that the operating condition of the stepper motor 130 is a partial-load condition.

Values of the differential duty signal $D_{diff}$ provided at the output of the subtractor 708 may increase as the load torque $\tau_L$ at the stepper motor 130 increases from zero (or substantially zero) to approximately 2.4 Nm. The stepper motor 130 may be rated to handle a certain range of load torque $\tau_L$. The diagram 800 shows that the load torque $\tau_L$ of approximately 2.4 Nm is approaching an upper limit of that certain range of load torque $\tau_L$. Values of the differential duty signal $D_{diff}$ provided at the output of the subtractor 708 may decrease as the load torque $\tau_L$ at the stepper motor 130 exceeds the upper limit. In at least one example, decreasing values of the differential duty signal $D_{diff}$ provided at the output of the subtractor 708 that are above the threshold value 802 may be indicative of an over-load condition at the stepper motor 130.

The differential duty signal $D_{diff}$ provided at the output of the subtractor 708 may have a value 808 indicating that the operating condition of the stepper motor 130 is a stall condition when the load torque $\tau_L$ is approximately 3.0 Nm. The value 808 of the differential duty signal $D_{diff}$ breaches the threshold value 802 indicative of the stall condition at the stepper motor 130. In at least one example, the threshold value 802 is defined using one or more of a no-load value (e.g., the value 804) and a stall value (e.g., the value 808) of the differential duty signal $D_{diff}$. One aspect of defining the threshold value 802 may involve setting the threshold value 802 sufficiently low to facilitate distinguishing between the no-load condition and the stall condition at the stepper motor 130. Another aspect of defining the threshold value 802 may involve setting the threshold value 802 sufficiently high to facilitate distinguishing between a load torque $\tau_L$ of zero or substantially zero Nm at the stepper motor 130 and the stall condition at the stepper motor 130.

FIG. 9 is a diagram 900 of example signal waveforms that show interquadrant power transfer variations within the system 100 responsive to different operating conditions at the stepper motor 130. The diagram 900 includes plots 902, 904, 906, and 908. Plot 902 represents the coil current $I_m$ of the stepper motor 130 as a function of radians. The coil current $I_m$ of plot 902 may be determined according to: $I_m$ sin($\omega$t), where t denotes time. Plot 904 represents $P_{mtr\_run}$ as a function of radians when the operating condition of the stepper motor 130 is the no-load condition. Plot 906 represents $P_{mtr\_run}$ as a function of radians when the operating condition of the stepper motor 130 is a partial-load condition. Plot 908 represents $P_{mtr\_run}$ as a function of radians when the operating condition of the stepper motor 130 is a maximum-load condition. As describe above with respect to FIG. 8, the stepper motor 130 may be rated to handle a certain range of load torque $\tau_L$. In at least one example, the maximum-load condition represents an operating condition in which a non-zero load torque $\tau_L$ at the stepper motor 130 approaches an upper limit of that certain range of load torque $\tau_L$. In this example, the stepper motor 130 may be described as approaching a stall-load condition. Negative values (e.g., values below an x-axis) of $P_{mtr\_run}$ in plots 904, 906, and 908, are indicative of power being transferred from the stepper motor 130 to the stepper driver 120 within the system 100. Such negative values of $P_{mtr\_run}$ may occur responsive to the stepper driver 120 implementing the FD mode. Positive values (e.g., values above an x-axis) of $P_{mtr\_run}$ in plots 904, 906, and 908, are indicative of power being transferred from the stepper driver 120 to the stepper motor 130 within the system 100. Such positive values of $P_{mtr\_run}$ may occur responsive to the stepper driver 120 implementing the DRV mode.

The stepper driver 120 induces rotational movement of the rotor 131 by controlling the coil current $I_m$ to create a rotating magnetic field for the rotor 131 to follow. The rotational movement of the rotor 131 induces $V_{Bemf}$. $V_{Bemf}$ may have a substantially sinusoidal waveform. $V_{Bemf}$ opposes the rotational movement of the rotor 131 by reducing the coil current $I_m$. A positive correlation may exist between the rotational movement of the rotor 131 and $V_{Bemf}$. Increasing the rotational movement of the rotor 131 may increase $V_{Bemf}$. Inversely, decreasing the rotational movement of the rotor 131 may decrease $V_{Bemf}$.

When the operating condition of the stepper motor 130 is the no-load condition, a 90-degrees phase difference may exist between the coil current $I_m$ and $V_{Bemf}$ such that $V_{Bemf}$ may be determined according to: $V_{Bemf}$ sin($\omega$t-($\pi$/2)). $P_{mtr\_run}$ comprises negative values for approximately a duration of Quadrant 1 in Plot 904 responsive to the no-load condition at the stepper motor 130. $P_{mtr\_run}$ comprises positive values for approximately a duration of Quadrant 2 in Plot 904 responsive to the no-load condition at the stepper motor 130. In at least one example, $P_{mtr\_run}$ under the no-load condition is zero (or substantially zero) over the one-half cycle of coil current $I_m$ represented by Quadrants 1 and 2 in Plot 904. When the operating condition of the stepper motor 130 is the partial-load condition, a 45-degrees phase difference may exist between the coil current $I_m$ and $V_{Bemf}$ such that $V_{Bemf}$ may be determined according to: $V_{Bemf}$ sin($\omega$t-($\pi$/4)). $P_{mtr\_run}$ comprises both positive values and negative values within a duration of Quadrant 1 in Plot 906 responsive to the partial-load condition at the stepper motor 130. In plot 906, $P_{mtr\_run}$ may comprise negative values between value 910 and value 912. In plot 906, $P_{mtr\_run}$ may comprise positive values between value 912 and value 914. $P_{mtr\_run}$ comprises positive values for approximately a duration of Quadrant 2 in Plot 906 responsive to the partial-load condition at the stepper motor 130. In at least one example, $P_{mtr\_run}$ under the partial-load condition is positive over the one-half cycle of coil current $I_m$ represented by Quadrants 1 and 2 in Plot 906, such that more power is being transferred to the stepper motor 130 than is being transferred from the stepper motor 130. When the operating condition of the stepper motor 130 is the maximum-load condition, a 0-degree phase difference may exist between the coil current $I_m$ and $V_{Bemf}$ such that $V_{Bemf}$ may be determined according to: $V_{Bemf}$ sin($\omega$t). $P_{mtr\_run}$ comprises positive values for approximately a duration of Quadrant 1 and a duration of Quadrant 2 in Plot 908 responsive to the maximum-load condition at the stepper motor 130. In at least one example, $P_{mtr\_run}$ under the maximum-load condition zero $P_{mtr\_run}$ may approach or approximate an upper limit of a range of values that $P_{mtr\_run}$ may assume inasmuch as $P_{mtr\_run}$ comprises positive values for both Quadrants 1 and 2 of Plot 908.

The diagram 900 shows that variations may exist in how the system 100 transfers power within a given quadrant of the coil current $I_m$ under different operating conditions of the stepper motor 130. Phase differences between the coil current $I_m$ and $V_{Bemf}$ may be indicative of such power transfer variations within the system 100. Non-sinusoidal behavior by $V_{Bemf}$ may negatively impact an accuracy of determining an operating condition of the stepper motor 130 using phase differences between the coil current $I_m$ and $V_{Bemf}$. As described above, $P_{mtr\_run}$ at a given angular velocity $\omega$ of the rotor 131 without the electrical energy-related aspects of power transfer within the system 100 may be determined according to equation (11), where ($D_{run}-D_{stall}$) denotes $D_{diff}$. In at least one example, $P_{mtr\_run}$ at a given angular velocity $\omega$ of the rotor 131 without the electrical energy-related aspects of power transfer within the system 100 may also be determined according to:

$$V_m * I_m * (D_{run} - D_{stall}) = V_{bemf} * I_m \quad (12)$$

The differential duty signal $D_{diff}$ may also be indicative of such power transfer variations within the system 100. The differential duty signal $D_{diff}$ may be unimpacted by non-sinusoidal behavior. Using the differential duty signal $D_{diff}$ to determine an operating condition of the stepper motor 130 may mitigate negative impacts on accuracy associated with non-sinusoidal behavior.

Figure 10:
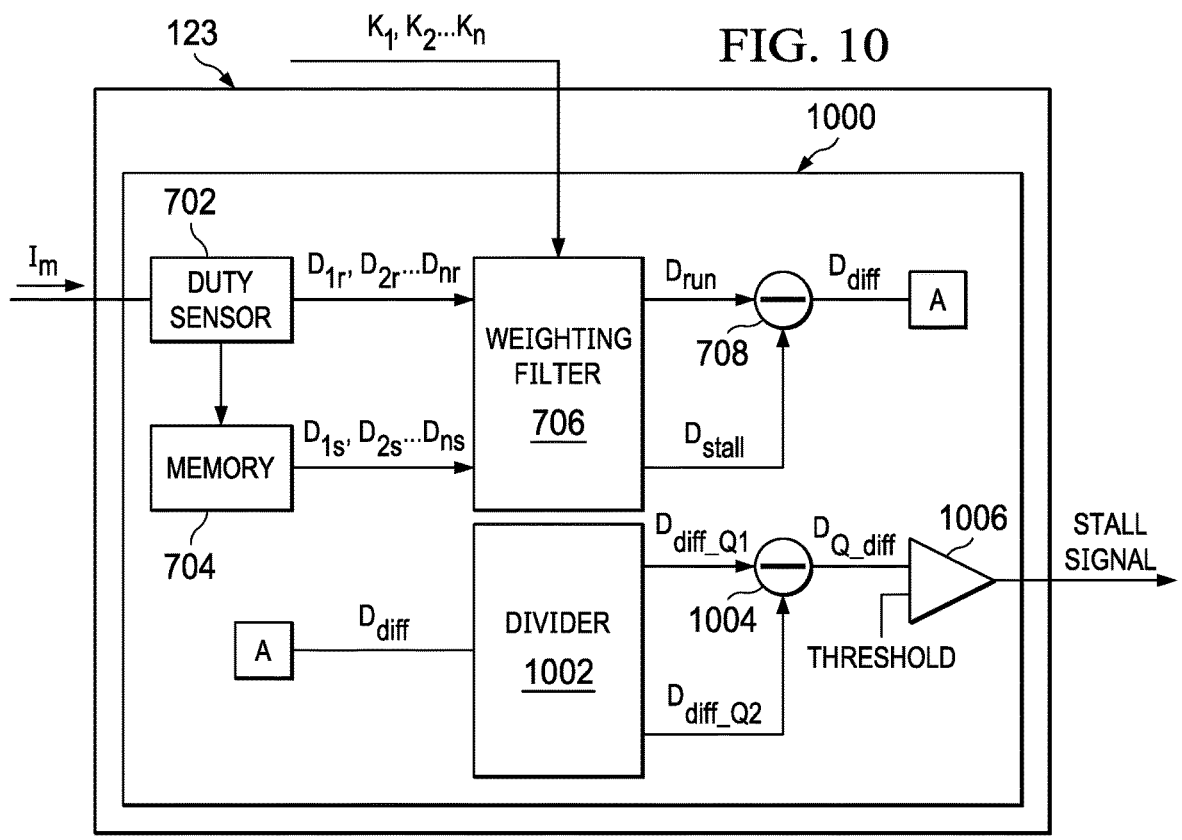
FIG. 10 is a block diagram of an example circuit that is useful to implement aspects of the stall detection circuit, in accordance with various examples.

FIG. 10 is a block diagram of an example circuit 1000 that is useful to implement aspects of the stall detection circuit 123. Example circuit 1000 may be implemented using digital circuitry, analog circuitry, memory, a processor, software and/or a combination of any of the above. In at least some examples, the stall detection circuit 123 can include the duty sensor 702, the memory 704, the weighting filter 706, and the subtractor 708. In at least some examples, the stall detection circuit 123 can also include a divider 1002, a subtractor 1004, and a comparator 1006. The divider 1002 is configured to partition the differential duty signal $D_{diff}$ provided at an input of the divider 1002 into duty subset signals corresponding to different quadrants of a cycle of the coil current $I_m$. The duty subset signals may include a first duty subset signal $D_{diff\_Q1}$ and a second duty subset signal $D_{diff\_Q2}$. The first duty subset signal $D_{diff\_Q1}$ may correspond to a first quadrant (e.g., Quadrant 1 of the diagram 900) of a half-cycle of the coil current $I_m$. The second duty subset signal $D_{diff\_Q2}$ may correspond a second quadrant (e.g., Quadrant 2 of the diagram 900) of the half-cycle adjacent to the first quadrant. In at least one example, the first duty subset signal $D_{diff\_Q1}$ and the second duty subset signal $D_{diff\_Q2}$ are weighted averages of the differential duty signal $D_{diff}$ over the first and second quadrants of the half-cycle of the coil current $I_m$, respectively. The subtractor 1004 is configured to deduct the second duty subset signal $D_{diff\_Q2}$ from the first duty subset signal $D_{diff\_Q1}$ to provide a quadrant differential duty signal $D_{Q\_diff}$. As described above, variations may exist in how the system 100 transfers power within a given quadrant of the coil current $I_m$ under different operating conditions of the stepper motor 130. The quadrant differential duty signal $D_{Q\_diff}$ facilitates monitoring interquadrant power transfer variations within the system 100. The comparator 1006 is configured to, responsive to the quadrant differential duty signal $D_{Q\_diff}$ and a threshold value, provide a stall signal. In at least one example, the stall signal is indicative of an operating condition of the stepper motor 130 based on the run duty signal.

In at least one example, the quadrant differential duty signal $D_{Q\_diff}$ may include a range of values that extends between a lower value (e.g., zero, approximately zero or at/less than a threshold value) corresponding to an operating condition of the stepper motor 130 being a stall-condition and an upper value corresponding to the operating condition being a no-load condition. In this example, the lower value of the quadrant differential duty signal $D_{Q\_diff}$ may involve a value of $V_{Bemf}$ being zero under the stall-condition. In this example, the upper value of the quadrant differential duty signal $D_{Q\_diff}$ may involve $P_{mtr\_run}$ comprising positive values for a duration of the second quadrant (e.g., Quadrant 2 of Plot 904) of the half-cycle of the coil current $I_m$ while having negative values for a duration of the first quadrant (e.g., Quadrant 1 of Plot 904) under the no-load condition. In at least one example, the range of values for the quadrant differential duty signal $D_{Q\_diff}$ may include a first value between the lower value and the upper value that corresponds to the operating condition being a partial-load condition. In this example, the first value of the quadrant differential duty signal $D_{Q\_diff}$ may involve $P_{mtr\_run}$ having positive values for a duration of the second quadrant (e.g., Quadrant 2 of Plot 906) of the half-cycle of the coil current $I_m$ while having both positive and negative values for a duration of the first quadrant (e.g., Quadrant 1 of Plot 906) under the partial-load condition. In at least one example, the range of values for the quadrant differential duty signal $D_{Q\_diff}$ may also include a second value (e.g., almost zero) between the lower value and the first value that corresponds to the operating condition being a maximum-load condition. In this example, the second value of the quadrant differential duty signal $D_{Q\_diff}$ may involve $P_{mtr\_run}$ comprising substantially similar positive values for both the first and second quadrants (e.g., Quadrants 1 and 2 of Plot 908) of the half-cycle of the coil current $I_m$ under the maximum-load condition.

Figure 11:
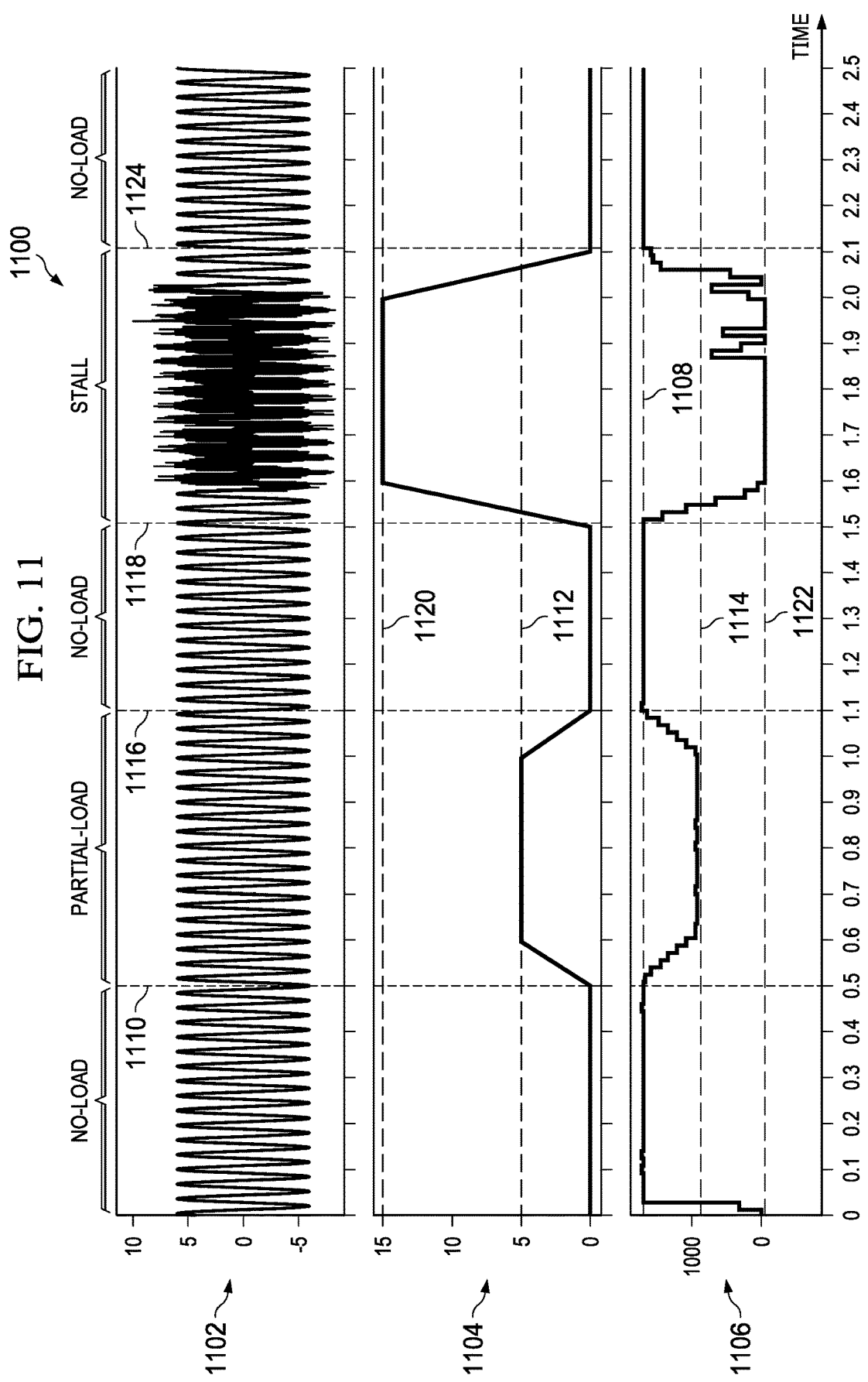
FIG. 11 is a diagram of example signal waveforms that show monitoring of interquadrant power transfer variations within the system.

FIG. 11 is a diagram 1100 of example signal waveforms that show monitoring interquadrant power transfer variations within the system 100 to determine an operating condition at the stepper motor 130. The diagram 1100 includes plots 1102, 1104, and 1106. Plot 1102 represents the coil current $I_m$ of the stepper motor 130 as a function of time. Plot 1104 represents the load torque $\tau_L$ at the stepper motor 130 (in Nm) as a function of time. Plot 1106 represents example values of the quadrant differential duty signal $D_{Q\_diff}$ provided at an output of the subtractor 1004 as a function of time. In at least one example, values of the quadrant differential duty signal $D_{Q\_diff}$ may be unitless. Prior to time 1110, the quadrant differential duty signal $D_{Q\_diff}$ provided at the output of the subtractor 1004 may have a value 1108 indicating that an operating condition of the stepper motor 130 is a no-load condition when the load torque $\tau_L$ is zero or substantially zero Nm. At time 1110, the load torque $\tau_L$ increases from zero or substantially zero Nm towards a level 1112 (e.g., 5 Nm) indicative of a partial-load condition at the stepper motor 130. Responsive to the load torque $\tau_L$ increasing towards the level 1112, the quadrant differential duty signal $D_{Q\_diff}$ provided at the output of the subtractor 1004 may decrease from the value 1108 indicative of the no-load condition towards a value 1114 indicative of the partial-load condition at the stepper motor 130.

At time 1116, the load torque $\tau_L$ decreases from the level 1112 indicative of the partial-load condition to zero or substantially zero Nm that is indicative of the no-load condition at the stepper motor 130. Responsive to the load torque $\tau_L$ decreasing to zero or substantially zero Nm, the quadrant differential duty signal $D_{Q\_diff}$ provided at the output of the subtractor 1004 may increase to the value 1108 indicative of the no-load condition. At time 1118, the load torque $\tau_L$ increases from zero or substantially zero Nm towards a level 1120 (e.g., 15 Nm) indicative of a stall condition at the stepper motor 130. Responsive to the load torque $\tau_L$ increasing towards the level 1120, the quadrant differential duty signal $D_{Q\_diff}$ provided at the output of the subtractor 1004 may decrease from the value 1108 indicative of the no-load condition towards a value 1122 indicative of the stall condition at the stepper motor 130. At time 1124, the load torque $\tau_L$ decreases from the level 1120 indicative of the stall condition to zero or substantially zero Nm that is indicative of the no-load condition at the stepper motor 130. Responsive to the load torque $\tau_L$ decreasing to zero or substantially zero Nm, the quadrant differential duty signal $D_{Q\_diff}$ provided at the output of the subtractor 1004 may increase to the value 1108 indicative of the no-load condition.

The diagram 1100 shows that the quadrant differential duty signal $D_{Q\_diff}$ provided at the output of the subtractor 1004 may transition within a range of values as the operating condition at the stepper motor 130 changes. The value 1108 of the quadrant differential duty signal $D_{Q\_diff}$ indicative of the no-load condition may be an upper bound of that range of values. The value 1122 of the quadrant differential duty signal $D_{Q\_diff}$ indicative of the stall condition may be a lower bound of that range of values. In at least one example, the threshold value provided at an input of the comparator 1006 of FIG. 10 may be defined using one or more of a no-load value (e.g., the value 1108) and a stall value (e.g., the value 1122) of the quadrant differential duty signal $D_{Q\_diff}$.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component. While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs). While certain elements of some example embodiments may be included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A circuit adapted to be coupled to a coil of a motor via an H-bridge circuit, the circuit comprising:
    a duty sensor coupled to the coil of the motor and configured to provide raw run duty data responsive to a coil current through the coil;
    a subtractor coupled to the duty sensor and configured to provide a differential duty signal responsive to a stall duty signal and a run duty signal obtained using the raw run duty data; and
    a comparator coupled to the subtractor and configured to provide a stall signal indicative of a stall condition for the motor responsive to the differential duty signal and a threshold value.

2. The circuit of claim 1, wherein the duty sensor is further configured to provide raw stall duty data responsive to the coil current through the coil during the stall condition, the stall duty signal obtained using the raw stall duty data.

3. The circuit of claim 1, further comprising:
    a weighting filter coupled to the duty sensor and configured to provide a run duty signal responsive to the raw run duty data and a step coefficient $K_n$ for step-n of the coil current.

4. The circuit of claim 3, wherein $K_n=\sin((90°/M)*n)$, and M denotes a total number of steps in a quarter-cycle of the coil current.

5. The circuit of claim 1, wherein a value of the differential duty signal increases as a load torque of the motor increases.

6. The circuit of claim 1, wherein the stall signal indicates detection of the stall condition when a value of the differential duty signal breaches the threshold value.

7. The circuit of claim 1, wherein the threshold value is below a value of the differential duty signal when the motor is in a no-load condition.

8. The circuit of claim 1, wherein the run duty signal is scalable with respect to: an angular velocity of the motor, a motor supply voltage, a peak coil current, a number of steps in a cycle of coil current, or a combination thereof.

9. A circuit adapted to be coupled to a coil of a motor via an H-bridge circuit, the circuit comprising:
    a duty sensor coupled to the coil and configured to provide raw run duty data responsive to a coil current through the coil;
    a first subtractor coupled to the duty sensor and configured to provide a differential duty signal responsive to a stall duty signal and a run duty signal based on the raw run duty data, the differential duty signal having a first duty subset signal and a second duty subset signal, wherein the first duty subset signal corresponds to a first quadrant of a half-cycle of the coil current and the second duty subset signal corresponds to a second quadrant of the half-cycle adjacent to the first quadrant;

a second subtractor coupled to the first subtractor and configured to deduct the second duty subset signal from the first duty subset signal to provide a quadrant differential duty signal; and a comparator coupled to the second subtractor and configured to provide a stall signal responsive to the quadrant differential duty signal and a threshold value.

10. The circuit of claim 9, further comprising:

a divider coupled to the first subtractor and configured to partition the differential duty signal into duty subset signals corresponding to different quadrants of a cycle of the coil current.

11. The circuit of claim 9, wherein the first and second duty subset signals are weighted averages of the differential duty signal over the first and second quadrants of the half-cycle of the coil current, respectively.

12. The circuit of claim 9, wherein a value of the quadrant differential duty signal indicative of a no-load condition is an upper bound of a range of values for the quadrant differential duty signal.

13. The circuit of claim 9, wherein a value of the quadrant differential duty signal indicative of a stall condition is a lower bound of a range of values for the quadrant differential duty signal.

14. The circuit of claim 9, wherein the threshold value is defined using one or more of a no-load value and a stall value of the quadrant differential duty signal.

15. The circuit of claim 9, wherein an effective duty cycle value $D_{nr}$ of the raw run duty data at step-n of the coil current is determined using a difference over a duration of step-n between a cumulative drive time and a cumulative fast decay time.

16. A stepper motor driver adapted to be coupled to a coil of a stepper motor, the stepper motor driver comprising:

an H-bridge circuit connected to the coil and operable to provide a coil current to the coil;

a gate driver coupled to the H-bridge circuit and operable to control the H-bridge circuit by providing a pulse modulated signal to the H-bridge circuit; and a stall detection circuit coupled to the coil and configured to monitor power transferred to the stepper motor through a duty cycle of the pulse modulation signal, the stall detection circuit including:

a duty sensor coupled to the coil and configured to provide raw duty data responsive to the coil current; and a comparator coupled to the duty sensor and configured to provide a stall signal indicative of an operating condition of the stepper motor based on the raw duty data.

17. The stepper motor driver of claim 16, wherein a control signal provided at an input of the stepper motor driver varies responsive to the stall signal transitioning to a value indicative of the operating condition of the stepper motor being a stall condition.

18. The stepper motor driver of claim 16, wherein the stall detection circuit further includes:

a subtractor coupled to the duty sensor and configured to provide a differential duty signal using the raw duty data, wherein the comparator is configured to provide the stall signal responsive to the differential duty signal and a threshold value.

19. The stepper motor driver of claim 16, wherein the raw duty data is raw run duty data, and wherein the stall detection circuit further includes:

a first subtractor coupled to the duty sensor and configured to deduct a stall duty signal from a run duty signal obtained using the raw run duty data to provide a differential duty signal having a first duty subset signal and a second duty subset signal, wherein the first duty subset signal corresponds to a first quadrant of a half-cycle of the coil current and the second duty subset signal corresponds to a second quadrant of the half-cycle that follows the first quadrant; and a second subtractor coupled to comparator and configured to deduct the second duty subset signal from the first duty subset signal to provide a quadrant differential duty signal, wherein the comparator is configured to provide the stall signal responsive to the quadrant differential duty signal and a threshold value.

20. The stepper motor driver of claim 19, wherein a first value of the quadrant differential duty signal indicative of a no-load condition is an upper bound of a range of values for the quadrant differential duty signal, and a second value of the quadrant differential duty signal indicative of a stall condition is a lower bound of the range of values.

* * * * *